(12) United States Patent
Hoffer et al.

(10) Patent No.: US 8,632,674 B2
(45) Date of Patent: Jan. 21, 2014

(54) HEAVY METAL PASSIVATOR/TRAP FOR FCC PROCESSES

(75) Inventors: Bram Willem Hoffer, Fanwood, NJ (US); David Matheson Stockwell, Westfield, NJ (US)

(73) Assignee: BASF Corporation, Florham Park, NJ (US)

( * ) Notice: Subject to any disclaimer, the term of this patent is extended or adjusted under 35 U.S.C. 154(b) by 476 days.

(21) Appl. No.: 12/947,327

(22) Filed: Nov. 16, 2010

(65) Prior Publication Data

US 2012/0118793 A1    May 17, 2012

(51) Int. Cl.
*C10G 11/04* (2006.01)
*C10G 11/18* (2006.01)

(52) U.S. Cl.
USPC ........ 208/121; 208/119; 208/120.2; 208/122; 208/124

(58) Field of Classification Search
USPC ................ 208/119, 120.2, 121, 122, 124
See application file for complete search history.

(56) References Cited

U.S. PATENT DOCUMENTS

| | | | | |
|---|---|---|---|---|
| 3,445,521 A | * | 5/1969 | Callahan et al. | 568/477 |
| 4,148,712 A | * | 4/1979 | Nielsen et al. | 208/78 |
| 4,466,884 A | * | 8/1984 | Occelli et al. | 208/120.1 |
| 4,988,432 A | * | 1/1991 | Chin | 208/121 |
| RE37,842 E | * | 9/2002 | Bertus et al. | 208/120.2 |
| 6,723,228 B2 | * | 4/2004 | Su et al. | 208/113 |
| 7,678,735 B2 | | 3/2010 | Stockwell | |
| 8,197,669 B2 | * | 6/2012 | Vierheilig | 208/119 |
| 2006/0060504 A1 | * | 3/2006 | Vierheilig | 208/113 |
| 2007/0123417 A1 | * | 5/2007 | Stockwell | 502/331 |

OTHER PUBLICATIONS

Edward Furimsky, Chapter 13, Residues Upgrading by Catalytic Cracking, Catalysts for Upgrading Heavy Petroleum Feeds, Studies in Surface Science and Catalysis, Aug. 2007, vol. 169, pp. 305-333.*

* cited by examiner

Primary Examiner — Nina Bhat
Assistant Examiner — Jonathan Miller
(74) Attorney, Agent, or Firm — Bernard Lau (57) ABSTRACT

The present invention provides a catalyst mixture comprising FCC catalysts and a metal passivator/trap and use thereof in trapping metal contaminants during the catalytic cracking of hydrocarbon feedstocks.

21 Claims, 3 Drawing Sheets

HEAVY METAL PASSIVATOR/TRAP FOR FCC PROCESSES

FIELD OF THE INVENTION

The present invention provides a metal passivator/trap and methods to mitigate the deleterious effect of metals on catalytic cracking of hydrocarbon feedstocks. This objective is achieved through the use of a mixed metal additive as a passivator and a trap for metal contaminants.

BACKGROUND OF THE INVENTION

Catalytic cracking is a petroleum refining process that is applied commercially on a very large scale. About 50% of the refinery gasoline blending pool in the United States is produced by this process, with almost all being produced using the fluid catalytic cracking (FCC) process. In the FCC process, heavy hydrocarbon fractions are converted into lighter products by reactions taking place at high temperatures in the presence of a catalyst, with the majority of the conversion or cracking occurring in the gas phase. The FCC hydrocarbon feedstock (feedstock) is thereby converted into gasoline and other liquid cracking products as well as lighter gaseous cracking products of four or fewer carbon atoms per molecule. These products, liquid and gas, consist of saturated and unsaturated hydrocarbons.

In FCC processes, feedstock is injected into the riser section of a FCC reactor, where the feedstock is cracked into lighter, more valuable products upon contacting hot catalyst circulated to the riser-reactor from a catalyst regenerator. As the endothermic cracking reactions take place, carbon is deposited onto the catalyst. This carbon, known as coke, reduces the activity of the catalyst and the catalyst must be regenerated to revive its activity. The catalyst and hydrocarbon vapors are carried up the riser to the disengagement section of the FCC reactor, where they are separated. Subsequently, the catalyst flows into a stripping section, where the hydrocarbon vapors entrained with the catalyst are stripped by steam injection. Following removal of occluded hydrocarbons from the spent cracking catalyst, the stripped catalyst flows through a spent catalyst standpipe and into a catalyst regenerator.

Typically, catalyst is regenerated by introducing air into the regenerator and burning off the coke to restore catalyst activity. These coke combustion reactions are highly exothermic and as a result, heat the catalyst. The hot, reactivated catalyst flows through the regenerated catalyst standpipe back to the riser to complete the catalyst cycle. The coke combustion exhaust gas stream rises to the top of the regenerator and leaves the regenerator through the regenerator flue. The exhaust gas generally contains nitrogen oxides (NOx), sulfur oxides (SOx), carbon monoxide (CO), oxygen ($O_2$), HCN or ammonia, nitrogen and carbon dioxide ($CO_2$).

The three characteristic steps of the FCC process that the cracking catalyst undergoes can therefore be distinguished: 1) a cracking step in which feedstock is converted into lighter products, 2) a stripping step to remove hydrocarbons adsorbed on the catalyst, and 3) a regeneration step to burn off coke deposited on the catalyst. The regenerated catalyst is then reused in the cracking step.

A major breakthrough in FCC catalysts came in the early 1960's, with the introduction of molecular sieves or zeolites. These materials were incorporated into the matrix of amorphous and/or amorphous/kaolin materials constituting the FCC catalysts of that time. These new zeolitic catalysts, containing a crystalline aluminosilicate zeolite in an amorphous or amorphous/kaolin matrix of silica, alumina, silica-alumina, kaolin, clay or the like were at least 1,000-10,000 times more active for cracking hydrocarbons than the earlier amorphous or amorphous/kaolin containing silica-alumina catalysts. This introduction of zeolitic cracking catalysts revolutionized the fluid catalytic cracking process. New processes were developed to handle these high activities, such as riser cracking, shortened contact times, new regeneration processes, new improved zeolitic catalyst developments, and the like.

The new catalyst developments revolved around the development of various zeolites such as synthetic types X and Y and naturally occurring faujasites; increased thermal-steam (hydrothermal) stability of zeolites through the inclusion of rare earth ions or ammonium ions via ion-exchange techniques; and the development of more attrition resistant matrices for supporting the zeolites. The zeolitic catalyst developments gave the petroleum industry the capability of greatly increasing throughput of feedstock with increased conversion and selectivity while employing the same units without expansion and without requiring new unit construction.

After the introduction of zeolite containing catalysts the petroleum industry began to suffer from a lack of crude availability as to quantity and quality accompanied by increasing demand for gasoline with increasing octane values. The world crude supply picture changed dramatically in the late 1960's and early 1970's. From a surplus of light-sweet crudes the supply situation changed to a tighter supply with an ever-increasing amount of heavier crudes, such as petroleum residues, having a higher sulfur content.

Petroleum resid(ue) is the heavy fraction remaining after distillation of petroleum crudes at atmospheric pressure (atmospheric resid) or at reduced pressure (vacuum resid). Resids have a high molecular weight and most often contain polycyclic aromatic hydrocarbons (PAH's). These molecules have more than 3-4 aromatic rings and provide the greatest limitation to the conversion of the resids into the desired products. This is because of their high stability and the lack of sufficient hydrogen in the ring structures to be converted to smaller more useful molecules. Moreover, the desired products, e.g. transportation fuels, are limited to alkylated single aromatic rings. No matter which type of resid conversion process is applied, a substantial fraction of resid molecules have fragments, which can be cracked off to become liquids (or gas) in the transportation fuels and vacuum oil boiling range. The aromatic cores cannot be cracked under FCC cracking conditions (in order to also remove these species hydrocracking must be considered). Therefore, one should not attempt to overly convert resids because then the selectivity will shift to the thermodynamically favored, but lower valued products: coke and gaseous hydrocarbons. As a result, gasoline yields are lower in residue such as FCC processing. These heavier and high sulfur crudes and residues present processing problems to the petroleum refiner in that these heavier crudes invariably also contain much higher metals with accompanying significantly increased asphaltic content. Typical contaminant metals are nickel, vanadium, and iron.

It has long been known that topped crudes, residual oils and reduced crudes with high levels of contaminating metals reduce the refiners selectivity to valuable transportation fuels and FCC catalysts can be deactivated at relatively high metal concentrations, e.g., 5,000-10,000 ppm in combination with elevated regenerator temperatures. In particular, when reduced crude containing feeds with high vanadium and nickel levels are processed over a crystalline zeolite containing catalyst, rapid deactivation of the zeolite can occur. This deactivation manifests itself in substantial measure as a loss of the crystalline zeolitic structure. This loss has been observed at vanadium levels of 1,000 ppm or less. The loss in the crystalline zeolitic structure becomes more rapid and severe with increasing levels of vanadium and at vanadium levels of about 5,000 ppm, particularly at levels approaching 10,000 ppm complete destruction of the zeolite structure may occur. Typically, the effects of vanadium deactivation at vanadium levels of less than 10,000 ppm can be reduced by increasing the addition rate of virgin catalyst, but it is financially costly to do so. As previously noted, vanadium poisons the cracking catalyst and reduces its activity. The literature in this field has reported that vanadium compounds present in feedstock become incorporated into the coke (which is deposited on the cracking catalyst), and is then oxidized to vanadium pentoxide in the regenerator as the coke is burned off (M. Xu et al. J. Catal. V. 207 (2), 237-246). At 700-830° C. in the presence of air and steam, Vanadium ("V") will be in a surface mobile state in an acidic form. This Vanadium species reacts with cationic sodium, facilitating its release from the Y exchange site. The sodium metavanadate thus formed hydrolyzes in steam to form NaOH and metavanadic acid, which may again react with Na+ cations. V thus catalyzes the formation of the destructive NaOH.

Iron and nickel on the other hand are not mobile. The nickel containing hydrocarbons deposits on the catalyst and forms nickel oxide in the regenerator. In the riser section it may be reduced to metallic nickel, which, like metallic iron, catalyzes the dehydrogenation of hydrocarbons to form undesired hydrogen and coke. High hydrogen yields are undesirable because it can lead to limitations in the FCC downstream operations (the wet gas compressor is volume limited). High amounts of coke can otherwise lead to regenerator air blower constraints, which may result reduced feed throughput.

Because compounds containing vanadium and other metals cannot, in general, be readily removed from the cracking unit as volatile compounds, the usual approach has been to trap and/or passivate these compounds under conditions encountered during the cracking process. Trapping or passivation may involve incorporating additives into the cracking catalyst or adding separate additive particles along with the cracking catalyst. These additives combine with the metals and either act as "traps" or "sinks" for mobile Vanadium species, so that the active component of the cracking catalyst is protected, or act as passivators to immobilize Ni and Fe. The metal contaminants are then removed along with the catalyst withdrawn from the system during its normal operation and fresh metal trap is added with makeup catalyst, so as to enable a continuous withdrawal of the detrimental metal contaminants during operation. Depending upon the level of the harmful metals in the feedstock, the quantity of additive may be varied relative to the makeup catalyst in order to achieve the desired degree of metals trapping and/or passivation.

Modified FCC catalysts that incorporate various types of alumina is well known. For example, commonly assigned U.S. Pat. Nos. 6,716,338 and 6,673,235, which add a dispersible boehmite to the cracking catalysts. Upon calcination, the boehmite is converted to a transitional alumina phase, which has been found useful in passivation of nickel and vanadium contaminants in the hydrocarbon feedstock. Meanwhile, high surface area aluminas may also serve to trap vanadium and protect the zeolite. However, the high surface area aluminas do not passivate vanadium, so that the level of contaminant hydrogen and coke remains high.

Vanadium can also be trapped and effectively passivated by using alkaline earth metal containing traps (Ca, Mg, Ba) and/or Rare earth based traps, see the commonly assigned and co-pending application Ser. No. 12/572,777; U.S. Pat. Nos. 4,465,779; 4,549,958; 5,300,469; 7,361,264 However, these traps are sensitive to sulfur, and sulfur could block to active sites for vanadium trapping to make them less effective.

Usage of antimony and antimony compounds as passivators are also well known in the patent literature, see U.S. Pat. Nos. 3,711,422; 4,025,458; 4,031,002; 4,111,845; 4,148,714; 4,153,536; 4,166,806; 4,190,552; 4,198,317; 4,238,362 and 4,255,287. Reportedly, the antimony reacts with nickel to form a NiSb alloy, which is difficult to reduce under riser conditions, thus deactivating nickel for catalyzing the formation of hydrogen and coke. This process is commonly referred to as passivation.

In the commonly assigned U.S. Pat. No. 7,678,735, the addition of an ammoxidation catalyst to the FCC regenerator is described as reducing the emissions of NOx and NOx precursors during FCC catalyst regeneration. A particular useful ammoxidation catalyst is a mixed oxide of iron antimony and an additional metal, such as Mg, Mn, Mo, Ni, Sn, V or Cu. There is no mention in the patent of the specific utility of an ammoxidation catalyst in cracking of resids, and in particular, in the trapping and/or passivation of nickel and vanadium contaminants which can poison and/or deactivate the zeolite cracking catalyst.

SUMMARY OF THE INVENTION

The invention is directed towards an improved metal passivator/trap comprising a mixed metal oxide of antimony, at least one redox element and an optional promoter, and use thereof in trapping metal contaminants during the catalytic cracking of hydrocarbon feedstocks.

BRIEF DESCRIPTION OF THE DRAWINGS

For a fuller understanding of the nature and advantages of the present invention, reference should be made to the following detailed description read in the conjunction with the accompanying drawings.

DETAILED DESCRIPTION OF THE INVENTION

This invention is directed towards an improved metal passivator/trap and its use in conjunction with a FCC catalyst to catalyze petroleum oil feeds, which contain significant levels of metals contaminants (i.e. Ni and/or V). Specifically, the metals passivator/trap comprises a mixture of metal oxides to immobilize vanadium and nickel, such that the deactivation effect of the FCC catalyst by the metal contaminants in the hydrocarbon oil feeds is reduced, and/or the selectivity towards transportation fuels is increased (of all types utilized in FCC operations). The invention is particularly useful in the processing of carbo-metallic oil components found in whole crudes, topped crude, residual oil and reduced crude feeds in a modern fluid catalytic cracking unit.

The process of the present invention comprises the catalytic cracking of hydrocarbonaceous feedstock using a catalyst mixture comprising a first component of which is a cracking catalyst preferably contains within a matrix material, and a second component that comprises a mixed metal oxide alloy as described above having an effectiveness for metals passivation and metals trapping. The improvement of the present invention resides in the ability of the catalyst system to function well even when the feedstock contains high levels of metals.

It must be noted that "passivator" and "trap" are not used interchangeably, and that the mixture of metal oxides of the present invention contains components that either passivate or trap the metal contaminants. "Passivator" is defined as a composition that reduces the activity of unwanted metals, i.e. nickel and vanadium to produce contaminant $H_2$ and coke during the FCC process. While a "trap" is a composition that immobilizes contaminant metals that are otherwise free to migrate within or between microspheres in the FCC catalyst mixture, i.e. V and Na. A passivator may not necessarily immobilize V and a trap certainly may not passivate V.

Cracking Catalyst

The cracking catalyst component employed in the process of the present invention can be any cracking catalyst of any desired type having a significant activity. Preferably, the catalyst used herein is a catalyst containing a crystalline aluminosilicate, preferably ammonium exchanged and at least partially exchanged with rare earth metal cations, and sometimes referred to as "rare earth-exchanged crystalline aluminum silicate," i.e. REY, GREY, or REUSY; or one of the stabilized ammonium or hydrogen zeolites.

Typical zeolites or molecular sieves having cracking activity are used herein as a catalytic cracking catalyst are well known in the art. Synthetically prepared zeolites are initially in the form of alkali metal aluminosilicates. The alkali metal ions are typically exchanged with rare earth metal and/or ammonium ions to impart cracking characteristics to the zeolites. The zeolites are crystalline, three-dimensional, stable structures containing a large number of uniform openings or cavities interconnected by smaller, relatively uniform holes or channels. The effective pore size of synthetic zeolites is suitably between, but not limited to, 6 and 15 Å in diameter.

Zeolites that can be employed herein include both natural and synthetic zeolites. These zeolites include gmelinite, chabazite, dachiardite, clinoptilolite, faujasite, heulandite, analcite, levynite, erionite, sodalite, cancrinite, nepheline, lazurite, scolecite, natrolite, offretite, mesolite, mordenite, brewsterite, ferrierite, and the like. The faujasites are preferred. Suitable synthetic zeolites which can be treated in accordance with this invention include zeolites X, Y, including chemically or hydrothermally dealumintated high silica-alumina Y, A, L, ZK-4, beta, ZSM-types or pentasil, boralite and omega. The term "zeolites" as used herein contemplates not only aluminosilicates but also substances in which the aluminum is replaced by gallium or boron and substances in which the silicon is replaced by germanium. The preferred zeolites for this invention are the synthetic faujasites of the types Y and X or mixtures thereof. Alternatively, a catalytic catalyst known as Flex-Tec® from BASF Corporation is also useful. The amount of catalytic catalyst used for the present invention is of about 30 to about 95 wt % of the catalyst mixture. An amount of about 50 wt. % to about %90 wt. % is also useful.

To obtain a good cracking activity the zeolites have to be in a proper form. In most cases this involves reducing the alkali metal content of the zeolite to as low a level as possible. Further, high alkali metal content reduces the thermal structural stability, and the effective lifetime of the catalyst will be impaired as a consequence thereof. Procedures for removing alkali metals and putting the zeolite in the proper form are well known in the art, for example, as described in U.S. Pat. No. 3,537,816.

The zeolite can be incorporated into a matrix. Suitable matrix materials include the naturally occurring clays, such as kaolin, halloysite and montmorillonite and inorganic oxide gels comprising amorphous catalytic inorganic oxides such as silica, silica-alumina, silica-zirconia, silica-magnesia, alumina-boria, alumina-titania, and the like, and mixtures thereof. Preferably the inorganic oxide gel is a silica-containing gel, more preferably the inorganic oxide gel is an amorphous silica-alumina component, such as a conventional silica-alumina cracking catalyst, several types and compositions of which are commercially available. These materials are generally prepared as a co-gel of silica and alumina, co-precipitated silica-alumina, or as alumina precipitated on a pre-formed and pre-aged hydrogel. In general, silica is present as the major component in the catalytic solids present in such gels, being present in amounts ranging between about 55 and 100 weight percent. Most often however, active commercial FCC catalyst matrix are derived from pseudo-boehmites, boehmites, and granular hydrated or rehydrateable aluminas such as bayerite, gibbsite and flash calcined gibbsite, and bound with peptizable pseudoboehmite and/or colloidal silica, or with aluminum chlorohydrol. The matrix component may suitably be present in the catalyst of the present invention in an amount ranging from about 25 to about 92 wt. %, preferably from about 30 to about 80 wt. % of the FCC catalyst.

U.S. Pat. No. 4,493,902, the teachings of which are incorporated herein by cross-reference, discloses novel fluid cracking catalysts comprising attrition-resistant, high zeolitic content, catalytically active microspheres containing more than about 40 wt. %, preferably 50-70 wt. % Y faujasite and methods for making such catalysts by crystallizing more than about 40% sodium Y zeolite in porous microspheres composed of a mixture of two different forms of chemically reactive calcined clay, namely, metakaolin (kaolin calcined to undergo a strong endothermic reaction associated with dehydroxylation) and kaolin clay calcined under conditions more severe than those used to convert kaolin to metakaolin, i.e., kaolin clay calcined to undergo the characteristic kaolin exothermic reaction, sometimes referred to as the spinel form of calcined kaolin. In a preferred embodiment, the microspheres containing the two forms of calcined kaolin clay are immersed in an alkaline sodium silicate solution, which is heated, preferably until the maximum obtainable amount of Y faujasite is crystallized in the microspheres.

In practice of the '902 technology, the porous microspheres in which the zeolite is crystallized are preferably prepared by forming an aqueous slurry of powdered raw (hydrated) kaolin clay ($Al_2O_3$: $2SiO_2$: $2H_2O$) and powdered calcined kaolin clay that has undergone the exotherm together with a minor amount of sodium silicate which acts as fluidizing agent for the slurry that is charged to a spray dryer to form microspheres and then functions to provide physical integrity to the components of the spray dried microspheres. The spray dried microspheres containing a mixture of hydrated kaolin clay and kaolin calcined to undergo the exotherm are then calcined under controlled conditions, less severe than those required to cause kaolin to undergo the exotherm, in order to dehydrate the hydrated kaolin clay portion of the microspheres and to effect its conversion into metakaolin, this resulting in microspheres containing the desired mixture of metakaolin, kaolin calcined to undergo the exotherm and sodium silicate binder.

In illustrative examples of the '902 patent, about equal weights of hydrated clay and spinel are present in the spray dryer feed and the resulting calcined microspheres contain somewhat more clay that has undergone the exotherm than metakaolin. The '902 patent teaches that the calcined microspheres comprise about 30-60 wt. % metakaolin and about 40-70 wt. % kaolin characterized through its characteristic exotherm. A less preferred method described in the patent, involves spray drying a slurry containing a mixture of kaolin clay previously calcined to metakaolin condition and kaolin calcined to undergo the exotherm but without including any hydrated kaolin in the slurry, thus providing microspheres containing both metakaolin and kaolin calcined to undergo the exotherm directly, without calcining to convert hydrated kaolin to metakaolin.

In carrying out the invention described in the '902 patent, the microspheres composed of kaolin calcined to undergo the exotherm and metakaolin are reacted with a caustic enriched sodium silicate solution in the presence of a crystallization initiator (seeds) to convert silica and alumina in the microspheres into synthetic sodium faujasite (zeolite Y). The microspheres are separated from the sodium silicate mother liquor, ion-exchanged with rare earth, ammonium ions or both to form rare earth or various known stabilized forms of catalysts. The technology of the '902 patent provides means for achieving a desirable and unique combination of high zeolite content associated with high activity, good selectivity and thermal stability, as well as attrition-resistance.

Metal Passivator/Trap

The metal passivator/trap of the present invention reduces vanadium attack and nickel dehydrogenation of the cracking catalyst, during FCC cracking of gas oil and resids.

Useful mixed metal oxide catalysts for passivation/trapping in this invention is compromised of mixtures known as RSbM, wherein R is at least one redox element selected from the group consisting of $Fe^{2+/3+}$, $Ce^{3+/4+}$, $Cr^{2+/3+}$, $U^{5+/6+}$, Sn, and Mn. R makes lattice oxygen from $O_2$ replenish the $Sb^{3+/5+}$ active sites. The Rsb combination can be further improved by the addition of at least one optional promoter, M, selected from the group consisting of oxides Na, Zn, W, Te, Ca, Ba, Mo, Mg, Mn, Sn, and Cu.

In particular, the current invention is directed towards using iron-antimony (FeSb) on a carrier to passivate and/or trap Ni and V, wherein the reaction with nickel will take place in the reductive atmosphere of the riser, while the pick-up of vanadium will happen in the oxidative environment of the regenerator. The following equation illustrates this reaction:

$$Fe_2Sb_2O_8 + NiO + V_2O_5 \rightarrow 2FeVO_4 + NiSb_2O_6$$

Although iron is known to be a catalyst poison and leads to formation of hydrogen and coke, it was surprisingly found that the combination of Fe and Sb reduces the yield in hydrogen and coke.

The FeSb is prepared with a low surface area to limit $H_2$ formation. The Sb is mobile such that the Sb can find and passivate the Ni on the catalyst. Since Sb and V are similar in chemistry (V is also mobile), FeO, can react with V to form $FeVO_x$. FeVO, is stable as nonsulfating vanadate in the SOx containing regenerator gas. Without wishing to be bound by any theory of operation, we believe the FeSb structure facilitates the V to get inside or exchange into the iron oxide structure.

The ratio of R:Sb:M is also significant to the catalytic results. The atomic ratio of R:Sb:M may be in the range of 0.1-10 to 0.1-10 to 0-10, preferably 0.5-3 to 0.5-3 to 0-5.

The metal passivator/trap may be blended with separate zeolite catalyst particles before being introduced to an FCC unit. Alternatively, the passivator/trap particles can be charged separately to the circulating catalyst inventory in the cracking unit. Typically, the metal passivation/trap particles are present in amounts within the range of 1 to 50 wt. % by weight, preferably 2 to 30 wt. %, and most preferably 5 to 25 wt. % of the catalyst mixture. When used in insufficient amounts, improvements in vanadium and nickel passivation may not be sufficient. When employed in excessive amounts, cracking activity and/or selectivity may be impaired, and the operation becomes costly. Optimum proportions vary with the level of metal contaminants within oil feeds. Accordingly, the metal trapping component acts as a scavenger for the mobile metal contaminants to prevent such contaminants from reaching the cracking centers of the catalytically active component. The concentration of the passivator/trap in the catalyst mixture can be adjusted, so as to maintain a desired catalyst activity and conversion rate, preferably a conversion rate of at least 55%.

The passivator/trap of this invention is particularly useful for cracking oil feed containing a level of metal contaminants (i.e. Ni and/or V), having concentrations in the range of about 0.1 ppm of nickel and/or 0.1 ppm of vanadium, to about 200 ppm of metal contaminants comprising Nickel, Vanadium, and/or mixture thereof. However, it must be noted that during the FCC cracking, the amount of metal contaminants accumulated on the FCC catalyst can be as minimally as 300 ppm to as high as 40,000 ppm of metal contaminants comprising Nickel, Vanadium, and/or mixture thereof.

Carrier

Inert carrier support material may be used to carry the metal passivator/trap. The carrier support material is selected from the group consisting of but not limited to: (i) in situ FCC containing zeolites, (ii) calcined kaolins (iii) alumina and (iv) silica. If silica is used, zirconium may be added to provide thermal stability. Alumina such as Puralox® produced by Sasol is also useful. Calcined kaolins in the forms of microspheres are preferred. The method of making carriers used for the current invention can be found in the commonly assigned U.S. Pat. No. 7,678,735, which is incorporated herein by reference. The amount of carrier used is from about 1% to 99 wt %, preferably 5% to 95 wt % of the catalyst mixture. The carrier preferably has a surface area of about 5 to 200 m²/g.

Preparation of the Composition of the Present Invention (Impregnation)

The RSbM metal passivator/trap is generally prepared by 1) impregnating a carrier with an antimony solution; 2) impregnating the processed carrier from 1) with a solution of the redox element, such that only a portion of the pore volume of the carrier microsphere is filled, and 3) filling the remaining portion of the pore volume with a concentrated ammonium hydroxide solution. Accordingly, antimony chloride or antimony trioxide can be used to prepare the antimony solution.

The amount of the ammonium used is generally equal to the equivalents of the nitrates plus chlorides. This provides a neutral pH and the precipitation of the dissolved metals inside the microspheres at incipient wetness volume. The entrained ammonium nitrate salts can be explosive if dried. Therefore, the impregnated microspheres should be allowed to react for about 30 minutes, then slurried with deionized water, filtered and washed to remove the salts, leaving the RSbM hydrogels within the microspheres. The hydroxide mixture can then be calcined. If a promoter (M) is used, the promoter can be combined with the redox element in the second impregnation, or the ammonium solution in the third impregnation, such that each of the solutions remain fully dissolved and that the overall equivalents are being adjusted to provide neutrality, after both the acidic and basic solutions are impregnated.

Alternatively, the redox element can be added directly to the antimony prior to impregnation onto the inert carrier. In particular, the incorporation of metal cations in the antimony structure is carried out in a second synthesis step by addition of one or more metal salts (i.e. nitrates, chlorides or acetates) of the redox element:

$$Fe(OAc)_2 + 2Sb^{+5}(OH)_3O + 2H_2O \rightarrow Fe^{+2}[Sb^{+5}(OH)_4O]_2 + 2HOAc$$

The passivator/trap can also be prepared by introducing the metal salts in the production process (spray drying of kaolin clay, followed by calcination), or by co precipitation of Fe and Sb salts without carrier support, see Allen et al., Appl. Catal. A. Gen., 217 (2001), 31.

Application

The reaction temperature in accordance with the above-described process is at least about 900° F. (482° C.). The upper limit can be about 1,100° F. (593.3° C.) or more. The preferred temperature range is about 950° F. to about 1,050° F. (510° C. to 565.6° C.). The reaction total pressure can vary widely and can be, for example, about 5 to about 50 psig (0.34 to 3.4 atmospheres), or preferably, about 20 to about 30 psig (1.36 to 2.04 atmospheres). The maximum riser residence time is about 5 seconds, and for most charge stocks the residence time will be about 1.0 to about 2.5 seconds or less. For high molecular weight charge stocks, which are rich in aromatics, residence times of about 0.5 to about 1.5 seconds are suitable in order to crack mono- and di-aromatics and naphthenes which are the aromatics which crack most easily and which produce the highest gasoline yield, but to terminate the operation before appreciable cracking of polyaromatics occurs because these materials produce high yields of coke and $C_2$ and lighter gases. The length to diameter ratio of the reactor can vary widely, but the reactor should be elongated to provide a high linear velocity, such as about 25 to about 75 feet per second; and to this end a length to diameter ratio above about 20 to about 25 is suitable. The reactor can have a uniform diameter or can be provided with a continuous taper or a stepwise increase in diameter along the reaction path to maintain a nearly constant velocity along the flow path.

The weight ratio of catalyst to hydrocarbon in the feed is varied to affect variations in reactor temperature. Furthermore, the higher the temperature of the regenerated catalyst, the less catalyst is required to achieve a given reaction temperature. Therefore, a high regenerated catalyst temperature will permit the very low reactor density level set forth below and thereby help to avoid back mixing in the reactor. Generally catalyst regeneration can occur at an elevated temperature of about 1,250° F. (676.6° C.) or more. Carbon-on-catalyst of the regenerated catalyst is reduced from about 0.6 to about 1.5, to a level of about 0.3 wt. %. At usual catalyst to oil ratios, the quantity of catalyst is more than ample to achieve the desired catalytic effect and therefore if the temperature of the catalyst is high, the ratio can be safely decreased without impairing conversion. Since zeolitic catalysts, for example, are particularly sensitive to the carbon level on the catalyst, regeneration advantageously occurs at elevated temperatures in order to lower the carbon level on the catalyst to the stated range or lower. Moreover, since a prime function of the catalyst is to contribute heat to the reactor, for any given desired reactor temperature the higher the temperature of the catalyst charge, the less catalyst is required. The lower the catalyst charge rate, the lower the density of the material in the reactor. As stated, low reactor densities help to avoid back mixing.

It is to be understood that the catalyst mixture described above can be used in the catalytic cracking of any hydrocarbon charge stock containing metals, but is particularly useful for the treatment of high metals content charge stocks. Typical feedstocks are heavy gas oils or the heavier fractions of crude oil in which the metal contaminants are concentrated. Particularly preferred charge stocks for treatment using the catalyst mixture of the present invention include deasphalted oils boiling above about 900° F. (482° C.) at atmospheric pressure; heavy gas oils boiling from about 600° F. to about 1100° F. (343° C. to 593° C.) at atmospheric pressure; atmospheric or vacuum tower bottoms boiling above about 650° F.

The metal passivator/trap may be added to the FCC unit via an additive loader in the same manner as CO promoters and other additives. Alternatively, the metal passivator/trap may be pre-blended with the fresh FCC catalyst being supplied to the FCC unit.

Example 1

Preparing a Passivator/Trap Comprising a Mixture of Fe/Sb

1. Antimony Solution:
   Weighed an appropriated amount of $Sb_2O_3$ in a 50 ml beaker, filled the beaker with water up to 30 ml, and then heated mixture up to 70° C. Added $H_2O_2$ and maintained the mixture at 70° C. for 1 hour. The following reaction took place:

$$Sb_2O_3 + 2H_2O_2 + H_2O \rightarrow 2Sb(OH)_3O$$

The mixing and heating resulted in a milky white colloidal solution.

2. Impregnating Sb oxide-hydroxide onto an inert support:
   Placed a calcined kaolin support in a bowl and drizzled about one third of the solution from step 1. Wisped the support and repeated the process with the remaining two thirds of solution from step 1. Placed the impregnated support in a Pyrex bowl and dried the support overnight in a vented 100° C. oven.

3. Iron Solution:
   Weighed $Fe(NO_3)_3.9H_2O$ in a 50 ml beaker, filled the beaker with water up to 22 ml, then mixed the components until $Fe(NO_3)_3.9H_2O$ was dissolved.

4. Impregnated the processed inert support from step 2 with the iron solution from step 3, using procedure listed in step 2. The impregnated support was left at room temperature to allow the components to react for about 30 minutes, followed by slurried with deionized water, filtered and washed to remove unincorporated particles or salts. Placed the impregnated support (now containing both Fe and Sb) in a Pyrex bowl and to dry overnight in a vented 100° C. oven. Cooled the support to room temperature, then calcined the support at 400° C. for 3 hours in a vented oven.

Example 2

Following the steps from Example 1, passivators/traps of various ratio of Fe:Sb were made:

TABLE 1

| Sample | A | B | C |
|---|---|---|---|
| Constituents | Fe/Sb | Fe/Sb | Fe/Sb |
| Atomic Ratio | 1:2 | 1:1 | 2:1 |
| Support | Puralox | Puralox | Puralox |
| g of Support | 100 | 100 | 100 |
| Total Mox wt % | 5 | 5 | 5 |
| Wt % $Sb_2O_4$ target | 3.97 | 3.29 | 2.45 |
| g of $Sb_2O_3$ | 3.76 | 3.12 | 2.33 |
| g of $H_2O_2$ | 8.44 | 7.00 | 5.23 |
| Wt % $Fe_2O_3$ target | 1.03 | 1.71 | 2.55 |
| g of $Fe(NO_3)_3 \cdot 9H_2O$ | 5.49 | 9.1 | 13.57 |
| g of Water | 45.5 | 45.5 | 45.5 |
| % Distribution after calcination at 400 C. for 3 hours | | | |
| $Fe_2O_3$ | 1.03 | 1.71 | 2.46 |
| $Sb_2O_4$ | 3.30 | 2.84 | 2.32 |

TABLE 2

| Sample | D | E | F |
|---|---|---|---|
| Constituents | Fe/Sb | Fe/Sb | Fe/Sb |
| Atomic Ratio | 1:2 | 1:1 | 2:1 |
| Support | Calcined Kaolin | Calcined Kaolin | Calcined Kaolin |
| g of Support | 100 | 100 | 100 |
| Total Mox wt % | 5 | 5 | 5 |
| Wt % $Sb_2O_4$ target | 3.97 | 3.29 | 2.45 |
| g of $Sb_2O_3$ | 4.14 | 3.43 | 2.56 |
| g of $H_2O_2$ | 8.44 | 7.00 | 5.23 |
| Wt % $Fe_2O_3$ target | 1.03 | 1.71 | 2.55 |
| g of $Fe(NO_3)_3 \cdot 9H_2O$ | 5.49 | 9.1 | 13.57 |
| g of Water | 45.5 | 45.5 | 45.5 |
| % Distribution after calcination at 400 C. for 3 hours | | | |
| $Fe_2O_3$ | 1.71 | 2.43 | 3.15 |
| $Sb_2O_4$ | 3.08 | 1.95 | 1.35 |

TABLE 3

| Sample | G | H | I |
|---|---|---|---|
| Constituents | Fe/Sb | Fe | Sb |
| Atomic Ratio | 1:1 | N/A | N/A |
| Support | Calcined Kaolin | Calcined Kaolin | Calcined Kaolin |
| g of Support | 100 | 100 | 100 |
| Total Mox wt % | 5 | 5 | 5 |
| $Sb_2O_4$ target wt % | 3.29 | N/A | 5.00 |
| $Sb_2O_3$ g | 3.12 | N/A | 4.74 |
| $H_2O_2$ g | 6.99 | N/A | 10.62 |
| $Fe_2O_3$ target wt % | 1.71 | 5.00 | N/A |
| $Fe(NO_3)_3 \cdot 9H_2O$ g | 9.10 | 26.63 | N/A |
| Water g | 22 | 22 | 22 |
| Analysis (wt %) | | | |
| $Sb_2O_4$ | 2.99 | N/A | 3.68 |
| $Fe_2O_3$ | 2.45 | 5.59 | N/A |

The passivators/traps were incorporated within pre-metallated FCC catalysts, and the combinations were then steamed at 1450° F. for 4 hours in a flow of 90% steam/10% air prior to testing:

TABLE 4

| Sample | J | K | L | M |
|---|---|---|---|---|
| FCC Catalyst | Flex-Tec/ 3000 ppm Ni | Flex-Tec/ 3000 ppm Ni | Flex-Tec/ 3000 ppm V | Flex-Tec/ 3000 ppm V |
| wt % | 35 | 35 | 35 | 35 |
| Inert | Calcined Kaolin | Calcined Kaolin | Calcined Kaolin | Calcined Kaolin |
| wt % | 65 | 50 | 50 | 50 |
| Passivator | Not Added | Sample G | Not Added | Sample G |
| wt % | N/A | 15 | N/A | 15 |

TABLE 5

| Sample | N | O | P | Q | R |
|---|---|---|---|---|---|
| FCC Catalyst | Flex-Tec/ 3000 ppm Ni + 3000 ppm V | Flex-Tec/ 3000 ppm Ni + 3000 ppm V | Flex-Tec/ 3000 ppm Ni + 3000 ppm V | Flex-Tec/ 3000 ppm Ni + 3000 ppm V | Flex-Tec/ 3000 ppm Ni + 3000 ppm V |
| wt % | 60 | 60 | 60 | 60 | 60 |
| Inert | Calcined Kaolin | Calcined Kaolin | Calcined Kaolin | Calcined Kaolin | Calcined Kaolin |
| wt % | 25 | 30 | 35 | 39 | 40 |
| Passivator | Sample G | Sample G | Sample G | Sample G | Sample G |
| wt % | 15 | 10 | 5 | 1 | 0 |

Example 3

Metal passivators/traps comprising promoters were made:

1. Impregnation of 2.5% $Sb_2O_3$: 2.5% $Fe_2O_3$: 1% $MnO_2$ on calcined kaolin: Dissolved first 3.91 g of $SbCl_3$ in 25 ml deionized $H_2O$ and 15 ml of HCl (37%), then mixed in 12.62 g $Fe(NO_3)_3 \cdot 9H_2O$ and 3.53 g of $Mn(NO_3)_3 \cdot 4H_2O$. Applied 40 ml of the mixture onto 100 g of calcined kaolin, mixed well, dried the calcined kaolin at 100° C. overnight (16 hours). Calcined the impregnated carrier further at 400° C. for 3 hours in air. The percentage of yield was: 3.0862% of $Fe_2O_3$, 1.0944% of $MnO_2$, and 2.2779% $Sb_2O_3$.

2. Impregnation of 2.5% $Sb_2O_3$: 2.5% $Fe_2O_3$: 1% $WO_3$ on calcined kaolin: Dissolved first 3.91 g of $SbCl_3$ in 10 ml of HCl (37%) and 20 ml of deionized $H_2O$, secondly 1.52 g of Ammonium Metatungstate with 5 ml of HCl, then 12.65 g of $Fe(NO_3)_3 \cdot 9H_2O$. Applied 30 ml of the mixture onto 100 g of calcined kaolin, mixed well, dried the calcined kaolin at 100° C. overnight (16 hours). Calcined the impregnated carrier further at 400° C. for 3 hours in air. The percentage of yield was 3.37% of $Fe_2O_3$, 1.22% of $WO_3$, and 2.68% of $Sb_2O_3$.

3. Impregnation of 2.5% $Sb_2O_3$: 2.5% $Fe_2O_3$: 1% ZnO on calcined kaolin: Dissolved 3.91 g $SbCl_3$ in 20 ml of HCl (37%) and 15 ml deionize $H_2O$, then added 12.62 g of $Fe(NO_3)_3 \cdot 9H_2O$ and 3.62 g of $Zn(NO_3)_2$. Applied 35 ml of the mixture onto 100 g of calcined kaolin, mixed well, dried the calcined kaolin at 100° C. overnight (16 hours). Calcined the impregnated carrier further at 400° C. for 3 hours in air. The percentage of yield was 3.18% of $Fe_2O_3$, 0.843% of ZnO, and 2.63% of $Sb_2O_3$.

4. Impregnation of 2.5% $Sb_2O_3$: 2.5% $Fe_2O_3$: 1% SnO on calcined kaolin: Dissolved first 3.91 g of $SbCl_3$ in 10 ml HCl (37%) then added 12.65 g of $Fe(NO_3)_3 \cdot 9H_2O$ and 1.675 g of $SnCl_2 \cdot 2H_2O$, balanced with 20 ml of deionized $H_2O$. Applied 30 ml of the mixture onto 100 g of calcined kaolin, mixed well, dried the calcined kaolin at 100° C. overnight (16 hours). Calcined the impregnated carrier further at 400° C. for 3 hours in air. The percentage of yield was 2.78% of $Fe_2O_3$, 0.743% of SnO, and 2.65% of $Sb_2O_3$.

5. Impregnation of 2.5% $Sb_2O_3$: 2.5% $Fe_2O_3$: 1% $MoO_3$ on calcined kaolin: Dissolved first 3.91 g of $SbCl_3$ in 20 ml deionized $H_2O$ and 10 ml of HCl (37%), then 12.65 g $Fe(NO_3)_3.9H_2O$, and 1.43 g of $(NH_4)_2MoO_4$. Applied 30 ml of the mixture onto 100 g of calcined kaolin, mixed well, dried the calcined kaolin at 100° C. overnight (16 hours). Calcined the impregnated carrier further at 400° C. for 3 hours in air. The percentage of yield was: 3.03% of $Fe_2O_3$, 1.36% of $MoO_3$, and 2.59% $Sb_2O_3$.

Example 4

Flex-Tec in samples J and K was metallated to 3,000 ppm of nickel, by adding an appropriated amount of nickel and cyclohexane, mixed and poured onto a cordierite tray to air dry, then burned at 315° C. and calcined at 593° C. The passivators/traps were incorporated within pre-metallated FCC catalysts, and the combinations were then steamed at 1450° F. for 4 hours at 90% steam/10% air prior to testing.

Figure 1:
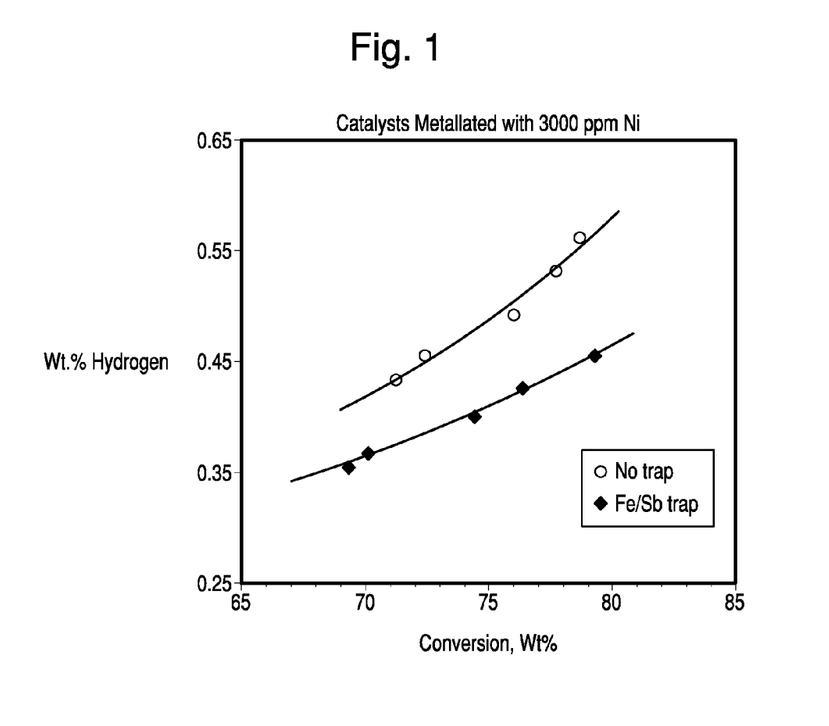
FIG. 1 illustrates a reduction of $H_2$ yield in wt % resulted from a FCC catalyst containing iron/antimony additive and Flex-Tec® metallated with 3,000 ppm of Ni at various conversion rates.

The hydrogen yield was measured on an ACE fluid-bed hydrocarbon cracking unit using a hydrocarbon oil feed. It can be shown in FIG. 1 that at various conversion rates of the catalyst, the hydrogen yield in wt % for sample K was 15% lower than sample J, the control sample.

Flex-Tec in samples L and M was metallated to contain 3,000 ppm of vanadium, by adding an appropriated amount of vanadium and cyclohexane, mixed and poured onto a cordierite tray to air dry, then burned at 315° C. and calcined at 593° C. The passivators/traps were then incorporated within pre-metallated FCC catalysts, and the combinations were then steamed at 1450° F. for 4 hours at 90% steam/10% air prior to testing.

Figure 2:
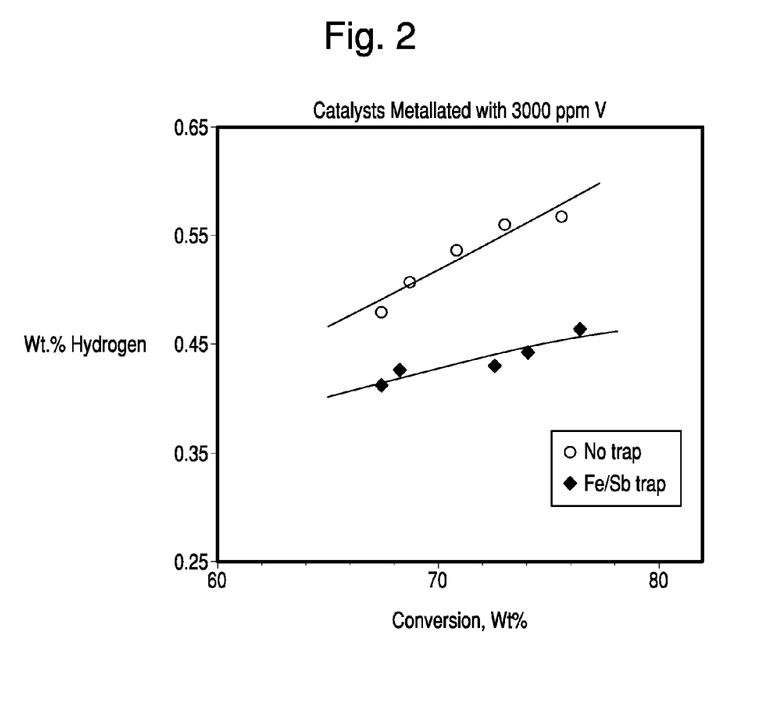
FIG. 2 illustrates a reduction of $H_2$ yield in wt % resulted from a FCC catalyst containing iron/antimony additive and Flex-Tec® metallated with 3,000 ppm of V at various conversion rates.

The hydrogen yield was measured on an ACE fluid-bed hydrocarbon cracking unit using a hydrocarbon oil feed. It can be shown in FIG. 2 that at various conversion rates of the catalyst, the hydrogen yield in wt % for sample M was 20% lower than sample J, the control sample.

Flex-Tec in samples N, O, P, Q and R was metallated to 3,000 ppm of nickel and 3,000 ppm of vanadium, by adding an appropriated amount of vanadium, nickel, and cyclohexane, mixed and poured onto a cordierite tray to air dry, then burned at 315° C. and calcined at 593° C. The rate of hydrocarbons being stripped and the amounts of hydrocarbon yields were measured on an ACE fluid-bed hydrocarbon cracking unit using a hydrocarbon oil feed. Table 6 shows the hydrocarbon yields for samples P and T at 75% of conversion rate:

TABLE 6

FCC cracking for zeolite catalyst vs. zeolite catalyst + Fe/Sb passivator/trap

|  | No passivator/trap added (Sample R) | Fe/Sb passivator/trap added (Sample N) |
|---|---|---|
| Conversion | 75.0 | 75.0 |
| Cat/Oil | 11.3 | 8.8 |
| Acty @ C/O = 5 | 1.7 | 1.9 |
| Yields in wt % |  |  |
| $H_2$ | 1.49 | 0.88 |
| Total C4- | 20.3 | 21.8 |
| Gasoline | 42.4 | 45.7 |
| LCD | 15.3 | 13.7 |
| HCO | 9.7 | 11.3 |
| Coke | 12.3 | 7.5 |

Figure 3:
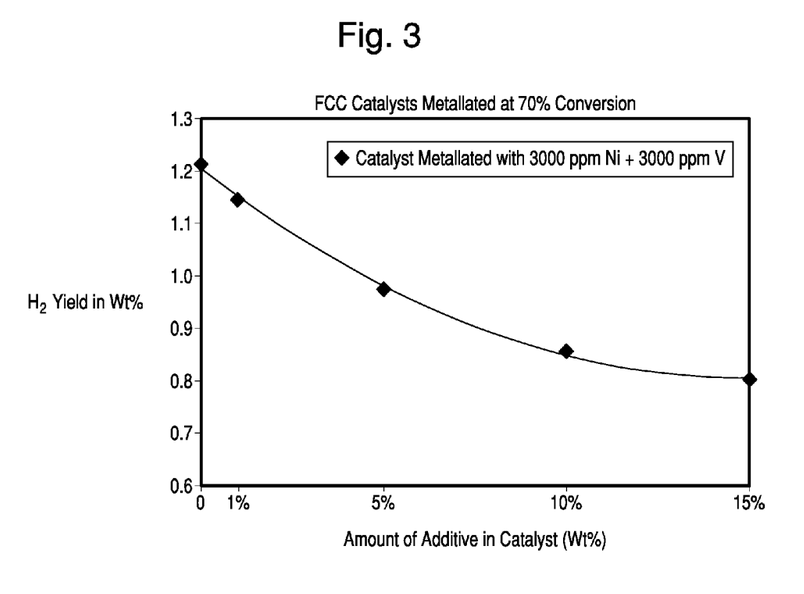
FIG. 3 illustrates a reduction of $H_2$ yield in wt % with an increase in amounts of an iron/antimony additive, used as a metal passivator/trap with a FCC catalyst contaminated with 3,000 ppm of Ni and 3,000 ppm of V.

It can be shown that $H_2$ and coke were significantly reduced (>30%), while the desirable products (gasoline and LPG) were increased in yield. FIG. 3 was plotted based on a 70% conversion rate of Samples R, Q, P, O, and N vs. the amount of $H_2$ yielded in wt %. It can be shown in FIG. 3 that as the amount of Fe/Sb passivator/trap increased (Samples N, O, P and Q), the amount of $H_2$ yield ultimately decreased about 28% from the control (Sample R).

The invention claimed is:

1. A method for passivating and/or trapping at least one metal contaminant from a hydrocarbon oil feed in a FCC unit bed comprising: contacting said hydrocarbon oil feed containing said at least one metal contaminant with a catalyst mixture comprising 1) a FCC catalyst, and 2) a metal passivator/trap comprising a mixture of R, Sb, and optionally M, wherein R is a redox element and M is an optional promoter, wherein said passivator/trap is present in amount of about 15 to 25 wt. % of said catalyst mixture.

2. The method of claim 1, wherein said hydrocarbon oil feed is selected from gas-oils, topped crudes, residual oils, reduced crudes, or mixture thereof.

3. The method of claim 1, wherein said redox element R is selected from $Fe^{2+/3+}$, $Ce^{3+/4+}$, $Cr^{2+/3+}$, $U^{5+/6+}$, Sn, or Mn.

4. The method of claim 1, wherein said promoter M is selected from oxides of Na, Zn, W, Te, Mo, Ca, Ba, Mg, Mn, Sn, or Cu.

5. The method of claim 1, wherein said at least one metal contaminant is selected from nickel, vanadium, or mixture thereof.

6. The method of claim 1, wherein said hydrocarbon oil feed comprises a residual oil.

7. The method of claim 1, wherein said metal contaminant is present in said hydrocarbon oil feed in an amount of at least about 0.1 ppm.

8. The method of claim 1, wherein said metal contaminant is present in said hydrocarbon oil feed in an amount of up to 200 ppm.

9. The method of claim 1, wherein after contacting said hydrocarbon oil feed with said catalyst mixture, said FCC catalyst has an accumulation of at least 300 ppm of said metal contaminant.

10. The method of claim 1, wherein after contacting said hydrocarbon oil feed with said catalyst mixture, said FCC catalyst has an accumulation of up to 40,000 ppm of said metal contaminant.

11. The method of claim 3, wherein said R is $Fe^{2+/3+}$.

12. The method of claim 4, wherein said M is an oxide of Zn, W, Mo, Mn or Sn.

13. The method of claim 1, wherein an atomic ratio of R:Sb:M is 0.1-10 to 0.1-10 to 0-10.

14. The method of claim 13, wherein said atomic ratio of R:Sb:M is 0.1-3 to 0.1-3 to 0-5.

15. The method of claim 1, wherein said metal passivator/trap additionally contains a support carrier selected from i) in-situ zeolite, ii) calcined kaolin, iii) alumina, iv) $SiO_2$.

16. The method of claim 15, wherein said support carrier is calcined kaolin.

17. The method of claim 15, wherein said support carrier is present in the amount of about 5 to 70 wt % of said passivator/trap.

18. The method of claim 1, wherein said catalyst mixture additionally comprises an inert carrier.

19. The method of claim 18, wherein said inert carrier is selected from i) in-situ zeolite, ii) calcined kaolin, iii) alumina, iv) $SiO_2$, or mixtures thereof.

20. The method of claim 19, wherein said inert carrier is calcined kaolin.

21. The method of claim 1, wherein said catalyst mixture maintains at least 55% conversion rate while processing said hydrocarbon oil feed in said FCC unit.

* * * * *